June 4, 1963 R. H. CLAY 3,092,218

BUILDING STRUCTURES SHIELDED AGAINST RADIO-FREQUENCY RADIATIONS AND COMPONENTS THEREOF

Filed June 1, 1959 4 Sheets-Sheet 1

INVENTOR.

RICHARD H. CLAY

BY Harry B. Keck

ATTORNEY

June 4, 1963 R. H. CLAY 3,092,218

BUILDING STRUCTURES SHIELDED AGAINST RADIO-FREQUENCY RADIATIONS AND COMPONENTS THEREOF

Filed June 1, 1959 4 Sheets-Sheet 2

INVENTOR.
RICHARD H. CLAY
BY Harry B. Keck
ATTORNEY

June 4, 1963 R. H. CLAY 3,092,218

BUILDING STRUCTURES SHIELDED AGAINST RADIO-FREQUENCY RADIATIONS AND COMPONENTS THEREOF

Filed June 1, 1959 4 Sheets-Sheet 3

INVENTOR.
RICHARD H. CLAY
BY Harry B. Keck
ATTORNEY

INVENTOR
RICHARD H. CLAY
BY [signature]
ATTORNEY 3,092,218

BUILDING STRUCTURES SHIELDED AGAINST RADIO-FREQUENCY RADIATIONS AND COMPONENTS THEREOF

Richard H. Clay, Pittsburgh, Pa., assignor to H. H. Robertson Company
Filed June 1, 1959, Ser. No. 817,262
13 Claims. (Cl. 189—34)

This invention relates to building structures adapted to be shielded against radio-frequency radiation, and, more particularly, to building panels adapted for assembly into such structures.

Known physiological hazards are involved in the exposure of human beings to intense radio-frequency radiation. To avoid these hazards, it is desirable to provide a housing for intense radio-frequency radiation generating sources which will confine the radiation; alternatively to provide personnel housing which will keep out such radiation. It is known that an imperforate metal shell, free of discontinuity, will confine such radiation. The confined radiation within a metal shell, however, can be transmitted outwardly into any adjacent electrical conducting material positioned close enough to the metal shell to allow for arcing of the radiation across the gap. In general, a minimum air gap of about two inches is desirable between such a metal shell and adjacent external metallic material, according to the radiation intensity. Thermal insulation of the metal shell for such buildings also is desirable, but must be accomplished within the primary requirements of radiation confinement.

Accordingly the principal object of this invention is to provide a building structure and panel units for assembling the same which are adapted to provide an imperforate, continuous metal inner sheet and a weatherproof metal outer sheet separated from electrical contact therewith.

A further object is to provide panel units which may be assembled quickly and conveniently into a building structure having thermal insulating properties and which may be adapted to confine or shut out radio-frequency radiation. In this regard, the assembled building structure may be used for many purposes before it is acceptable as a radio-frequency confining structure. Should radio-frequency confinement be required after assembly and occupancy of the structure, the necessary further steps can be accomplished without dismantling the structure or any part thereof.

The invention will be described in detail in the following description by reference to the accompanying drawings in which.

Figure 1:
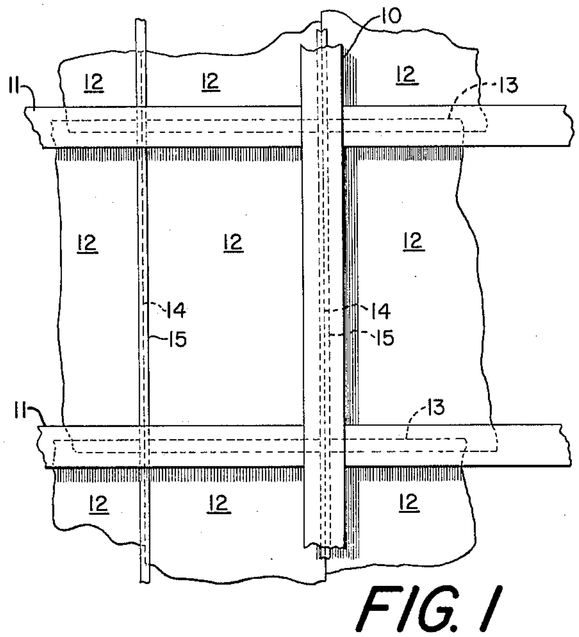
FIGURE 1 is a fragmentary side elevation of a building structure according to this invention.

Referring to FIGURE 1, a typical building structure according to the present invention is illustrated. The building skeleton comprises a plurality of vertical structural members 10 (columns) and horizontal structural members 11 (girts) which may be I-beams, angles, channel sections and the like. Building panels according to this invention are designated by the numeral 12. The building panels are secured exteriorly of the structural members 10 and 11. One complete building panel 12 and fragmentary portions of eight abutting building panels 12 are illustrated in FIGURE 1. Continuously welded horizontal junctures 13 are provided where the building panels 12 are in top-to-bottom relation. Co-operating lip members on each side of the building panels 12 form a side-by-side vertical seam 14 which is covered by a cover strip 15 which is welded to abutting building panels 12 along each of its sides.

Figure 2:
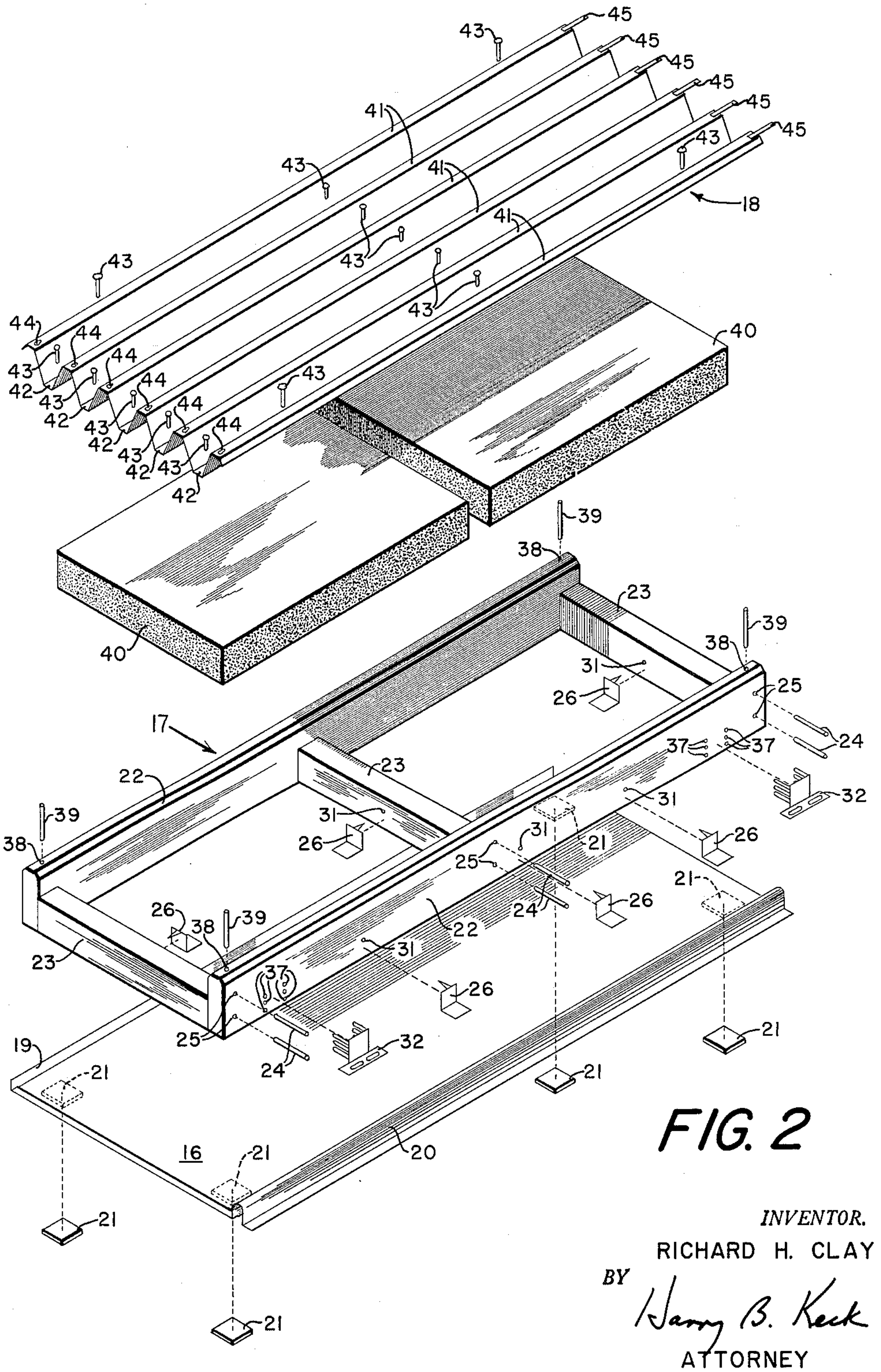
FIGURE 2 is an exploded perspective illustration detailing the assembly of a building panel according to this invention.

Referring to FIGURE 2, the building panels comprise principally a flat, imperforate metal inner facing sheet 16, a rectangular non-metallic frame 17, and a corrugated metal outer facing sheet 18.

The metal inner facing sheet 16 has a width corresponding to the desired building module, for example, about four feet, and a length corresponding to the vertical distance between structural elements in the desired building, for example, eight to twelve feet. If desired, the length may extend over two levels of the building. Preferably the inner facing sheet 16 is formed from sheet metal from about 12 gauge to about 22 gauge thickness.

The metal inner facing sheet 16 has a male lip 19 extending along one side and a corresponding female lip 20 extending along the opposite side. The lip elements of panels aligned in side-by-side relation are adapted to interlock. Secured inwardly of each corner of the metal inner facing sheet 16 are rectangular metal plates 21 which are affixed by welding as will be hereinafter described. One function of the metal plates 21 is to provide a welding surface for securing the assembled panel unit onto a building structure without introducing perforations or weaknesses into the metal inner facing sheet 16. Preferably the metal plates 21 are formed from metal from about 0.25 to 1.0 inch in thickness and hence are thicker than the metal sheet in the inner facing sheet 16.

The rectangular frame 17 or spacing element comprises two longitudinal elements 22 of non-metallic materials such as wood, plastics, reinforced plastics, light weight concrete and the like. The longitudinal elements are corniced along one edge to provide a close fit in the crest of a corrugation in the corrugated metal outer facing sheet 18 as will be hereinafter described. Transversely extending members 23 join the longitudinal members 22 at each end and at selected spaced distances between the ends. The transversely extending elements 23 similarly are constructed of non-metallic material and are secured to the longitudinal elements 22 by means of non-metallic fasteners, for example, glue-covered wooden dowels 24, inserted into drilled openings 25 which extend entirely through the longitudinal element 22 and for a sufficient distance into the transversely extending elements 23 to provide a secure rigid assembly.

Figure 4:
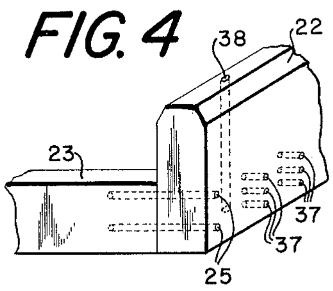
FIGURE 4 is a fragmentary perspective illustration of a preferred assembly of the non-metallic frame.

The preferred assembly is illustrated more clearly in an enlarged drawing in FIGURE 4. At each end of the longitudinal elements 22, a hole 38 is drilled. A wooden dowel 39, coated with glue, is driven into the hole 38. The wooden dowels 39 increase the resistance of the longitudinal elements 22 to splitting caused by forces exerted against the welding clips 32.

Figure 5:
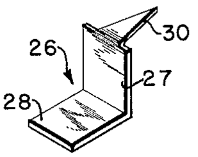
FIGURE 5 is a perspective illustration of a welding clip.

A plurality of single prong welding clips 26 are driven into the longitudinal elements 22 and the transversely extending elements 23 at spaced locations. These welding clips 26 are more clearly illustrated in FIGURE 5 which shows that each clip 26 is bent from a flat sheet of metal. The clip 26 has a body portion 27 and a welding plate 28 extending at right angles therefrom. The welding plate 28 may be secured to the inner facing sheet 16 by spot welding. A clenching element 30 extends at right angles from the body portion 27 and is adapted to be securely held in the non-metallic material which comprises the frame 17. Preferably small pilot holes 31 are drilled in the frames 17 to assure that the driving of the clenching element 30 will result in alignment of the bottom of the welding plate 28 with the bottom of the frame 17.

Figure 6:
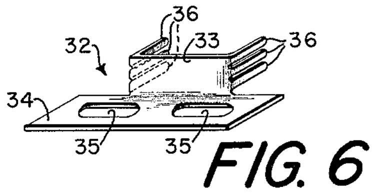
FIGURE 6 is a perspective illustration of a welding clip.

Additional welding clips 32 (more clearly illustrated in FIGURE 6) are provided for insertion into the outer surface of each of the longitudinal elements 22 near the end thereof. The weld clips 32 have a body portion 33 and a weld plate 34 extending at right angles thereto. Two elongated apertures 35 are provided in the weld plate 34 to admit welding metal for securing the weld plate 34, the metal inner facing sheet 16 and the rectangular metal plates 21. By providing two apertures 35, the clip 32 acquires universality and may be affixed at any of the corners of the frame 17. A plurality of clenching elements 36 extends at right angles from each side of the body portion 33. The clenching elements 36 preferably having a snubbed, tapered tip adapted for rigid fastening with the non-metallic longitudinal elements 22. Preferably pilot holes 37 corresponding to the clenching elements 36 are drilled into the longitudinal element 22 to assure alignment of bottom of the weld plate 34 with the bottom of the longitudinal element 22 and also to avoid splitting of the longitudinal element 22.

During assembly, the weld clips 26 and 32 are installed on the non-metallic frame 17. The frame 17 is positioned on the inner facing sheet 16 and spot welds are provided to secure each of the weld clips 26 and 32 to the inner facing sheet 16 whereby the frame 17 and the inner facing sheet 16 are rigidly connected.

The weld plate 34 is positioned opposite a metal plate 21. Provision of a plug weld in one of the apertures 35 serves to secure the weld plate 34 through the metal inner facing sheet 16 to the rectangular metal plate 21. The elements are secured in this manner without creating perforations or discontinuities in the metal inner facing sheet 16.

Insulating material 40, for example, pre-cut rectangular batts of fireproof thermal insulating material such as glass wool, is placed within the rectangular openings defined by the longitudinal elements 22 and the transversely extending elements 23.

The corrugated outer facing sheet 18, preferably a metal sheet covered on both surfaces with a weather proofing coating, may now be attached to the rectangular frame 17 to complete the assembly of the building panel. The corrugated sheet 18 has alternating crests 41 and bottoms 42. The outboard crests 41 tightly engage the corniced upper edge of the longitudinal elements 22. The bottoms 42 engage the upper surfaces of the transversely extending elements 23. The corrugated outer facing sheet 18 is secured at spaced points of contact with the rectangular frame 17 by means of non-metallic fasteners 43, preferably plastic nails.

A small portion of the weather proofing coating is removed along each of the crests 41 at each end of the corrugated panel 18. A bead 44 of weld metal is applied to each of the exposed metal portions at one end of the corrugated metal outer facing 18. A strip 45 of metal having electrical conducting properties is welded to each of the exposed portions of metal surface at the other end of the corrugated metal outer facing 18. Ultimately, when two panel sections are assembled in top-to-bottom relation, the strips 45 are welded at their freely extending portions to weld beads 44 of the adjacent panel to provide a continuous electrical conducting path for convenient leakage to ground.

Figure 3:
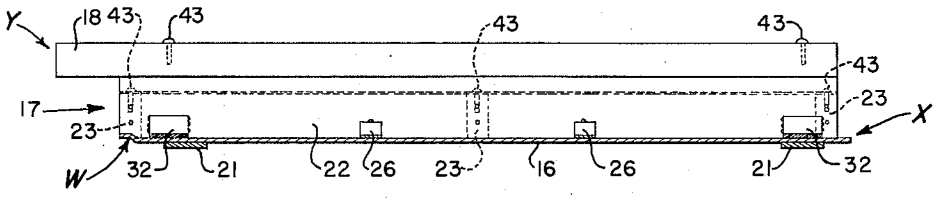
FIGURE 3 is a side elevation of a building panel according to a preferred embodiment of the invention.

Referring to FIGURE 3, there is illustrated more clearly a preferred overlapping assembly of the panel unit. The inner facing sheet 16 coterminates with the frame 17 at one end and extends slightly beyond the frame 17 at the other end as indicated by the letter X. The outer facing sheet 18 coterminates with the frame 17 at one end and extends slightly beyond the frame 17 at the other end as indicated by the letter Y. To aid further in assembly, the inner facing sheet 16 is countersunk as indicated at W by approximately the thickness of the metal sheet. This countersunk feature provides a surface for receiving the extension X of the abutting panel whereby a smooth inner building surface is achieved. Further, the overlapping assembly allows the two top-to-bottom panels to be joined by a single bead of weld metal to provide a continuous metal inner surface. The described overlapping assembly allows for convenient combination of two adjacent panel units in top-to-bottom relation as will be more fully illustrated in FIGURE 9.

Figures 7, 9:
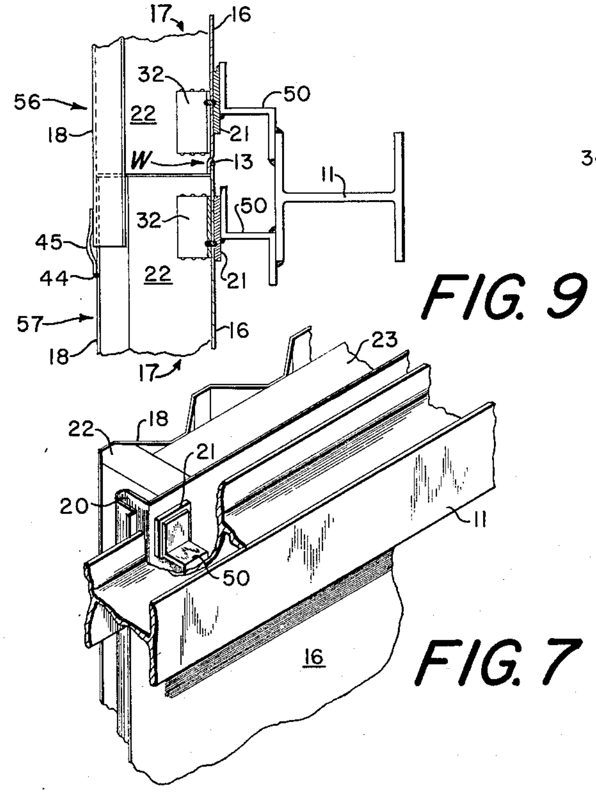
FIGURE 7 is a perspective fragmentary illustration showing the means for securing building panels in spaced external relation to a building girder.
FIGURE 9 is a cross-section view illustrating the detail assembly of two building panels in top-to-bottom relation.

The building panels thus assembled, can be secured into a building structure as illustrated in FIGURE 7 where corresponding numerals refer to elements already discussed. A horizontal girt 11 in the form of an I-beam, has a Z-bracket 50 secured to its outer surface preferably by welding. The outward flange of the Z-bracket 50 engages a metal plate 21 and can be welded thereto. By this technique, the panel unit 12 is secured in spaced relation to the horizontal girt 11 without introducing perforations into the inner facing sheet 16. A Z-bracket 50 is provided for securing the panel unit to a horizontal girt 11 at each of the metal plates 21. The spaced relation of the girt 11 and the building panels 12 resulting from the use of the Z-brackets 50, permits subsequent access to each seam for welding the assembled panels to provide a continuous metal shell for the building.

Figure 8:
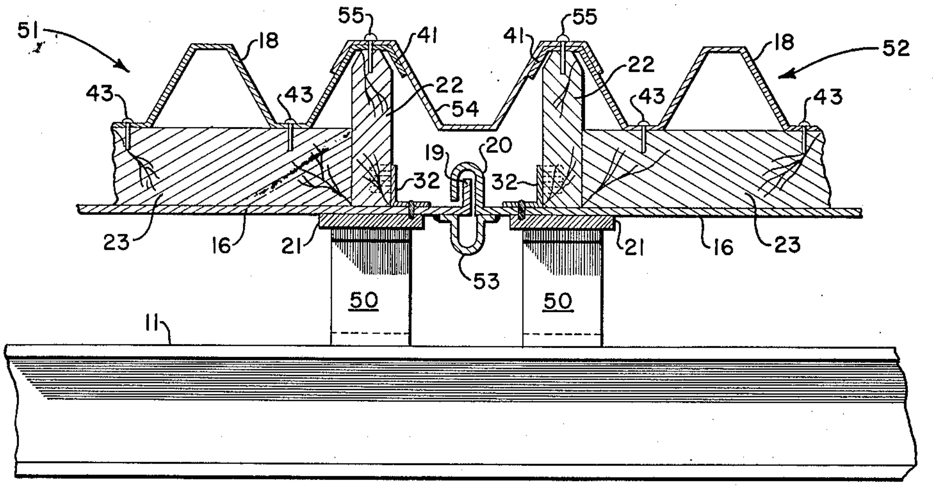
FIGURE 8 is a fragmentary cross-section view illustrating assembly details of two building panels in side-by-side relation.

Referring to FIGURE 8, the assembly of two panel units in side-by-side relation is illustrated. For convenience, the panel fragment on the left side is indicated by the numeral 51 and the panel fragment on the right side by the numeral 52. The metal plate 21 on the left side is welded to a Z-bracket 50. The male lip 19 of the panel 51 and the female lip 20 of the panel 52 are engaged and the metal plate 21 is welded to the Z-bracket 50 on the right side. An arcuate metal cover strip 53 extends across the seam between the panel units 51 and 52. The arcuate metal cover strip 53 is wielded along each of its sides to the inner facing sheet 16 whereby the two inner facing sheets 16 are joined in metal-to-metal contact free from discontinunity. Since the panel units 51 and 52 are spaced outwardly from the horizontal girt 11, it is possible to effect the requisite welding of the arcuate metal cover strip 53 after the panel units 51 and 52 have been completely secured to the building skeleton. The arcuate configuration of the metal cover strip 53 allows expansion and contraction of the assembled panel units to occur without introducing severe stresses into the welds extending along its edges.

A corrugated non-metallic strip 54 having two crests and one bottom is positioned over the adjoining outboard crests 41 on the two corrugated metal outer sheets 18. Preferably the corrugated non-metallic strip 54 is formed from reinforced plastic material. The corrugated non-metallic strip 54 is secured by non-metallic fasteners such as plastic nails 55 extending into the longitudinal element 22. Preferably batts of thermal insulating material not shown) are placed between the longitudinal members 22 before the corrugated non-metallic strip 54 is installed.

It should be noted by inspection of FIGURE 8 that there is no metal-to-metal connection between the inner facing sheet 16 and the outer facing sheet 18. A minimum separation distance between the facing sheets 16 and 18 preferably about two inches is preferred. Outward extensions from the inner metal facing sheet 16 include the weld clips 26 and 32 and the lip members 19 and 20. Each of these outward extensions is provided with a continuous metal-to-metal bond with the facing sheet 16 which permits ready leakage of electromagnetic phenomena whereby any arcing tendencies are minimized.

FIGURE 9 illustrates the manner of assembling two adjoining panels in top-to-bottom relation. For convenience, the top panel will be identified by the numeral 56 and the bottom panel by the numeral 57. Note initially that the corrugated outer facing sheet 18 extends beyond the frame 17 in the top panel 56, whereas the inner facing sheet 16 extends beyond the frame 17 in the lower panel 57. When the bottom panel 57 has been secured to the lower Z-bracket 50 by welding to the metal plate 21, the top panel 56 may be installed so that the two frames 17 are substantially in abutting relation. Accordingly the inner facing sheet 16 of the bottom frame 57 will extend in lapping relation over the inner facing sheet 16 of the top panel 56.

As hereinafter described, the inner facing sheet 16 of the top panel 56 is provided with a countersunk portion W to receive the extension of the inner facing sheet 16 from the bottom panel 57. Similarly the corrugated outer facing sheet 18 of the top frame 56 will extend over the outer surface of the corrugated outer facing sheet 18 of the bottom frame 57 in lapping relationship. A welded seam 13 is applied over the exposed seam between the two inner facing sheets 16 to provide a metal-to-metal bond free from discontinuities.

The metal strap 45 which is welded to the corrugated outer facing sheet 18 of the top panel 56 is welded at its freely extending end to the weld metal spot 44 in the bottom panel 57. Thus an assured electrical grounding of the outer metal facing is provided.

Figure 11:
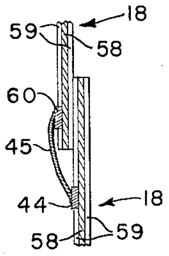
FIGURE 11 is a fragmentary cross-section view of the juncture of two corrugated outer facing sheets in top-to-bottom relation detailing to method of affixing electrical grounding strips.

FIGURE 11 illustrates this electrical grounding connection in greater detail. Referring to FIGURE 11, two lapped end portions of weatherproofed, coated metal sheet are illustrated in cross-section. Each sheet includes a metal thickness 58 covered on each surface with a weatherproof coating 59. A portion of the weatherproof coating 59 is removed from the exposed surface of each facing sheet. A bead of weld metal 44 is applied to one of the exposed portions. A bead of weld metal 60 and a metallic grounding strap 45 are welded to the exposed portion of the other sheet. On assembly at the building site, the freely extending end of the grounding strap 45 is welded to the bead of weld metal 44.

Figure 10:
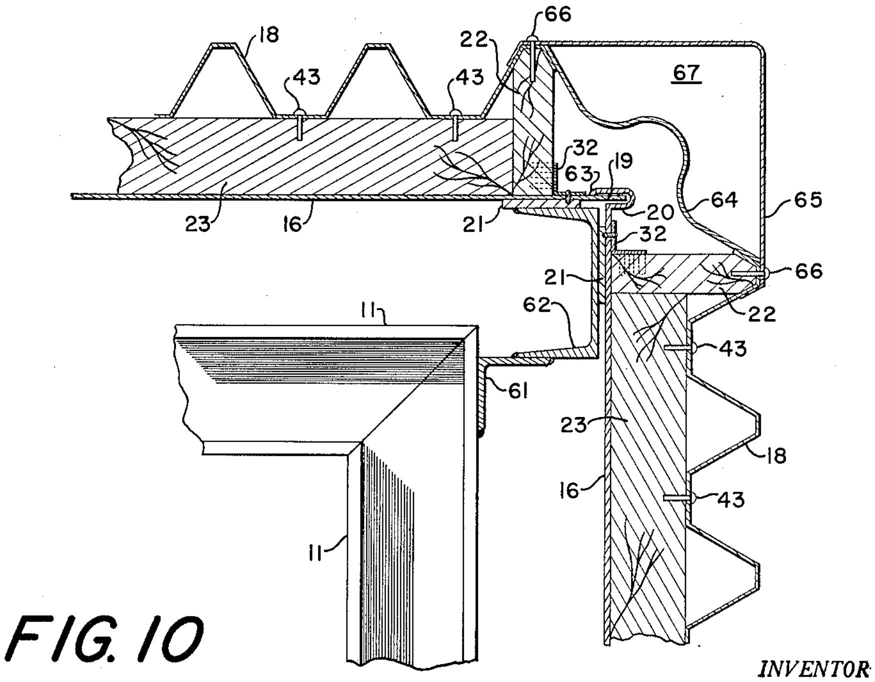
FIGURE 10 is a fragmentary cross-section view illustrating assembly details of two building panels forming a right angle corner in side-by-side relation.

FIGURE 10 has been included to illustrate the details of assembly of two panels in side-by-side relation at a corner of a building structure. Note that the male lip member 19 lies in the plane of the inner facing sheet 16 for this installation. The engagement of the lip members 19 and 20 corresponds to that already described. While Z-brackets of the type illustrated in FIGURES 7, 8 and 9 may be employed to secure the panels in spaced relation to the horizontal girts 11, an angle section 61 and a channel section 62 are shown in FIGURE 10 for this purpose. The angle section 61 is welded to the girt 11. The channel section 62 is welded to the angle section 61. The metal plates 21 are welded to the exterior bottom and side walls of the channel section 62. A welded seam 63 is applied along the juncture of the lips members 19 and 20 to provide a metal-to-metal bond, free of discontinuities.

A metallic ground strap 64 extends from a bared metal surface on one of the corrugated outer facing sheets 18 to a bared metal surface on the other sheet 18. The ground strap 64 is displaced from the lips 19 and 20 and from the weld clips 32. A non-metallic corner strip 65 is secured over the two outer metal facing sheets 18 by means of non-metallic fastener 66, such as plastic nails. Loose thermal insulation, if desired, may be packed into the chamber 67 which is enclosed by the corner strip 65.

Throughout the assembled building, flashing should be of non-metallic materials such as glass-fiber reinforced plastics.

It is a feature of this invention that a building structure can be erected which need not be protected against the escape of radio-frequency radiation from the commencement of its use as a building. However, when such radiation protection is desired, the structure can be accommodated by providing welds along the seams 13 (FIGURE 1) and 14 (FIGURE 1) when desired.

The weld seams required to provided radiation protection for the building can be completed without disturbing the individual panel units, i.e., all of the seams requiring welding are accessible to welding equipment.

Regardless of whether the assembled building structure is protected against escape of radio-frequency radiation, it possesses thermal insulation properties by virture of the inherent separation of inner and outer facing sheets from metal-to-metal contact. Should the radiation protection be provided, the assembled building also acquires vapor-proof properties which are of value in building installations requiring absolute confinement of internal vapors.

Figure 12:
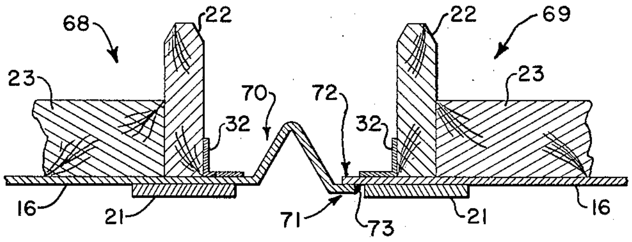
FIGURE 12 is a fragmentary cross-section illustration of a side-by-side juncture of two adjoining panels showing an alternative assembly structure.

FIGURE 12 has been included to illustrate an alternative juncture assembly for two panels in side-by-side relation. The structure shown in FIGURE 12 may be employed in place of the corresponding juncture best illustrated in FIGURE 8. Two panel fragments 68 (on the left) and 69 (on the right) are shown having longitudinal elements 22 and transverse elements 23 affixed to inner metal facing sheets 16. One lateral edge of each panel is provided with a U-shaped or arcuate-shaped lip 70 terminating in a flange 71 which is depressed beneath the surface of the inner metal facing sheet 16 from which it is formed by the thickness of the sheet. The other lateral edge of each panel is provided with a straight extension 72. The extension 72 of one panel is lapped by the flange 71 of the adjoining panel. A single weld seam 73 thereafter may be applied to provide metallic continuity for the metal shell of the building. The resiliency of the lip 70 allows for expansion and contaction of the structure without stressing the weld seam 73. The need for a vertical cover strip (53, FIGURE 8) and its two weld seams is avoided.

According to the provisions of the patent statutes, I have explained the principle, preferred embodiment and mode of operation of any invention and have illustrated and described what I now consider to represent its best embodiment. However, I desire to have it understood that, within the scope of the appended claims, the invention may be practiced otherwise than as specifically illustrated and described.

I claim:

1. An insulated panel unit comprising a flat, imperforate metal inner facing sheet, a longitudinally corrugated metal outer facing sheet, and a rectangular frame comprised entirely of non-metallic materials to which said inner and outer facing sheets are secured to form a unit therewith, said frame comprising two spaced longitudinal members and at least two transversely extending members, the longitudinal members of the frame being of a height and size to fit within corresponding corrugations of the outer metal facing sheet and engaging the inner surfaces of the crests of the corrugations to support the same, the height of said transversely extending members being related to the depth of the corrugations in said corrugated sheet to engage and support the bottoms of the corrugations, said frame lying wholly within the outer and inner sheets, said corrugated sheet being affixed to said frame by means of non-metallic fasteners, said imperforate metal inner sheet being welded to metal clips secured to said frame and extending outwardly therefrom in contact with said inner sheet, said clips being disposed in opposition to the said crests of said corrugated metal outer facing sheet, whereby the metal-to-metal distance between said inner and outer sheets is less than an arcing distance for radio-frequency radiation to prevent thereby transfer of radio-frequency radiation through said inner and outer sheets.

2. The panel of claim 1 wherein the metal-to-metal distance between said inner and outer sheets exceeds about two inches.

3. An insulated panel unit comprising a flat, imperforate metal inner facing sheet, a longitudinally corrugated metal outer facing sheet, and a rectangular frame comprised entirely of non-metallic materials to which said inner and outer facing sheets are secured to form a unit therewith, said frame comprising two spaced longitudinal members and at least two transversely extending members, the longitudinal members of the frame being of a height and size to fit within corresponding corrugations of the outer metal facing sheet and engaging the inner surfaces of the crests of the corrugations to support the same, the height of said transversely extending members being related to the depth of the corrugations in said corrugated sheet to engage and support the bottoms of the corrugations, said frame lying wholly within the outer and inner sheets, said corrugated sheet being affixed to said frame by means of non-metallic fasteners, said imperforate metal inner sheet being welded to metal clips secured to said frame and extending outwardly therefrom in contact with said inner sheet, said clips being disposed in opposition to the said crests of said corrugated metal outer facing sheet, whereby the metal-to-metal distance between said inner and outer sheets exceeds about two inches to prevent thereby transfer of radio-frequency radiation between said inner and outer sheets, and a plurality of metal plates secured to the exposed surface thereof by welded connection extending from selected metal clips through said metal inner facing sheet.

4. The panel of claim 3 wherein said metal plates have a thickness greater than that of said inner sheet.

5. The panel of claim 3 wherein correlative interlocking lips are provided along each lateral edge of said inner facing sheet.

6. In a building structure, a plurality of structural members disposed in parallel and spaced relation and a plurality of the building panels of claim 5 extended across and secured in spaced relation to said structural members, said panels being assembled in abutting relation with said correlative interlocking lips of adjacent panels cooperatively engaged, a metal cover strip extending between adjacent panels over the engaged lips thereof and being welded along each edge to the inner facing sheets, provide an uninterrupted metal surface comprising said inner facing sheets, and said metal cover strip, said inner facing sheets and said outer facing sheets being spaced apart whereby radio-frequency radiation is prevented from passing therebetween.

7. The panel of claim 3 wherein one lateral edge of the said inner facing sheet has a concave lip provided with a flat extension which is parallel to said inner facing sheet.

8. An insulated panel unit comprising a flat, imperforate metal inner facing sheet, a longitudinally corrugated metal outer facing sheet, and a spacing element therebetween comprised entirely of non-metallic materials to which said inner and outer facing sheets are secured to form a unit therewith, said spacing element being in part of a height and size to fit within corresponding corrugations of the outer metal facing sheet and engaging the inner surfaces of the crests of the corrugations to support the same, and being in part of a height which is related to the depth of the corrugations in said corrugated sheet to engage and support the bottoms of the corrugations, said spacing element lying wholly within the outer and inner sheets, said corrugated sheet being affixed to said spacing element by means of non-metallic fasteners, said imperforate metal inner sheet being welded to metal clips secured to said spacing element and extending therefrom in surface-to-surface contact with said inner sheet, said clips being disposed in opposition to the said crests of said corrugated metal outer facing sheet, whereby the metal-to-metal distance between said inner and outer sheets exceeds about two inches to prevent thereby transfer of radio-frequency radiation between said inner and outer sheets.

9. The panel unit of claim 8 having a plurality of metal plates having a thickness greater than said metal inner facing sheet secured to the outboard surface thereof by welded connections extending from selected metal clips through said metal inner facing sheet.

10. In a building structure, a plurality of structural members disposed in parallel and spaced relation and plurality of the building panels of claim 9 extended across and secured in spaced relation to said structural members, said panels being secured to said structural members by means of outwardly extending metal elements secured to said metal plates at one end and to said structural members at the other end, said panels being assembled in abutting relation to admit the welding together of said inner facing sheets of adjacent panels to provide an uninterrupted metal surface comprising said inner facing sheets, said inner facing sheets and said outer facing sheets being spaced apart whereby radio-frequency radiation is prevented from passing therebetween.

11. In a building structure, a plurality of structural members disposed in parallel and spaced relation and a plurality of the building panels of claim 1 extended across and secured in spaced relation to said structural members, said panels being assembled in abutting relation to admit the welding together of said inner facing sheets of adjacent panels to provide an uninterrupted metal surface comprising said inner facing sheets, said inner facing sheets and said outer facing sheets being spaced apart whereby radio-frequency radiation is prevented from passing therebetween.

12. In a building structure, a plurality of structural members disposed in parallel and spaced relation and plurality of insulated rectangular panels extended across and secured in spaced relation to said structural members, each panel unit comprising a flat imperforate metal inner facing sheet, a longitudinally corrugated outer metal facing sheet, a rectangular non-metallic insulating spacing element to which both metal facing sheets are secured to form a unit therewith, said metal inner facing sheet having a plurality of metal plates secured on its exposed surface by a metal-to-metal bond, said panels being secured to said structural members by means of outwardly extending metal elements secured to said metal plates at one end and to said structural members at the other end, said panels being assembled in abutting relation and spaced apart from said structural members to admit the welding together of said inner facing sheets of adjacent panels to provide an uninterrupted metal surface comprising said inner facing sheets, said inner facing sheets and said outer facing sheets being spaced apart whereby radio-frequency radiation is prevented from passing therebetween.

13. In a building structure, a plurality of structural members disposed in parallel and spaced relation and a plurality of insulated rectangular panels extended across and secured in spaced relation to said structural members, each panel unit comprising a flat imperforate metal inner facing sheet, a longitudinally corrugated outer metal facing sheet, a rectangular non-metallic insulating spacing element to which both metal facing sheets are secured to form a unit therewith, said inner metal facing sheet having an extension beyond said frame at one end and being countersunk by the thickness of the sheet material and coterminating with said frame at the other end, said corrugated outer metal facing sheet coterminating with said frame at one end and extending beyond said frame at the other end, said metal inner facing sheet having a plurality of metal plates secured on its exposed surface by a metal-to-metal bond, said panels being secured to said structural members by means of outwardly extending metal elements secured to said metal plates at one end and to said structural members at the other end, said panels being assembled in abutting relation and spaced apart from said structural members to admit the welding together of said inner facing sheets of adjacent panels to provide an uninterrupted metal surface comprising said inner facing sheets, electrical conducting connections between adjacent outer facing sheets, said inner facing sheets and said outer facing sheets being spaced apart whereby radio-frequency radiation is prevented from passing therebetween.

References Cited in the file of this patent

UNITED STATES PATENTS

| | | |
|---|---|---|
| 2,301,061 | Logeman | Nov. 3, 1942 |
| 2,403,359 | Gerhold | July 2, 1946 |
| 2,591,654 | Dean | Apr. 1, 1952 |
| 2,682,938 | MacDonald | July 6, 1954 |
| 2,696,281 | Hedgren et al. | Dec. 7, 1954 |
| 2,717,664 | Grafman | Sept. 13, 1955 |
| 2,724,303 | Holcomb | Nov. 22, 1955 |
| 2,743,372 | Browne et al. | Apr. 24, 1956 |
| 2,853,624 | Wigner et al. | Sept. 23, 1958 |
| 2,961,478 | Burns | Nov. 22, 1960 |